UNITED STATES PATENT OFFICE.

XAVIER HERMÉ, OF FRUITVALE, CALIFORNIA.

PREPARED CARBID OF CALCIUM.

No. 929,131.     Specification of Letters Patent.     Patented July 27, 1909.

Application filed June 11, 1908. Serial No. 437,994.

*To all whom it may concern:*

Be it known that I, XAVIER HERMÉ, a citizen of the United States, residing at Fruitvale, in the county of Alameda and State of California, have invented certain new and useful Improvements in Prepared Carbid of Calcium, of which the following is a specification.

My invention relates to an improvement in prepared carbid of calcium for use in the generation of acetylene gas.

I am aware that a prepared carbid of calcium has been heretofore employed for overcoming the defects of common carbid of calcium being very sensitive to dampness or moisture, and leaving as a residuum a layer of moist and solid lime which cannot pass through the openings of the receptacle containing the carbid as used in the production of the gas, by which conditions the development of such gas is continued long after the carbid ceases to be in direct contact with the water, but I am not aware that a prepared carbid of calcium has been ever invented or employed prior to my invention for the production of said gas by the use of a material free from said defects capable upon submersion of creating a gas giving a high percentage of light immediately upon such submersion. And it is the object of my invention to prepare the carbid in the manner hereinafter set forth to remove the said defects, and whereby a high percentage of light may be obtained immediately upon the use thereof in the usual manner.

The use of a prepared carbid of calcium containing the elements added thereto in accordance with my said invention results in the production of ninety per cent. of light from a given quantity of material, whereas said product heretofore employed is capable of producing but forty per cent. of light therefrom and this in a period approximating five minutes after submersion. A quantity of prepared carbid of calcium to which has been added the elements used in the preparation of the same according to my invention has not the tendency to form into a single lump or mass which condition has heretofore been encountered in the practice of generating gas by the use of the carbid heretofore employed as set forth.

In preparing carbid for the purposes of my invention, it is essential that the following method be substantially followed, wherefore, I take a certain quantity of carbid of calcium as sold commercially, and add thereto the following substances in the order named and in quantities in proportion to the carbid which I represent as having one hundred parts, to-wit: sugar one part, and thereupon petroleum one-fourth of one part; sugar one part, glucose four and one-half parts, and sugar two and one half parts. In the preparation of said carbid I prefer to use sugar in the form of powder, refined petroleum such as kerosene, gasolene, machine oil or the like, and the glucose in liquid form heated to the boiling point, by the use of which I obtain the best results, the substances being absorbed by the carbid as well as forming a coating therefor. By the use of the sugar and glucose, as mentioned, I obtain, among other things, the proper dissolution of the lime in the generation of the gas. The carbid together with the substances which I use in connection therewith are thoroughly mixed by agitation.

To illustrate the combination of my prepared carbid the parts hereinbefore mentioned may be designated pounds, aggregating one hundred and nine and one-fourth pounds a greater or less quantity being produced proportionately.

The petroleum as used in the preparation of the carbid is advantageous, among other things, in preserving the carbid from the undue action of moisture.

In the preparation of the carbid for said purposes the elements are agitated in a suitable vessel, or rotary drum as each successive ingredient is introduced until the absorption thereof or coating therewith is effected. By the application of the elements mentioned in the preparation of the carbid as described, I secure the thorough absorption of the elements and coating of the carbid free from any dead matter, thereby promoting the brilliancy and strength of the light.

The first quantity of sugar used with or added to the carbid is inserted in the vessel or drum to absorb the moisture attracted from the atmosphere contained therein, and the petroleum is poured over the carbid to give it some moisture, the product being properly dried by the last quantity of sugar used so as to prevent each piece or particle of carbid from adhering to any other, the substances substantially combined and mixed as aforesaid accomplishing the object of my invention.

Having thus described my invention what

I claim as new and desire to secure by Letters Patent, is:

As a new article of manufacture, a prepared carbid of calcium produced by mixing one part of sugar and one hundred parts of carbid of calcium; then successively mixing with said substances one fourth of one part of petroleum, one part of sugar, four and one half parts of glucose, and two and one half parts of sugar.

In testimony whereof I affix my signature, in presence of two witnesses.

XAVIER HERMÉ.

Witnesses:
F. E. FARMER,
CHAS. T. STANLEY.